United States Patent
Ebauer et al.

(10) Patent No.: US 11,400,568 B2
(45) Date of Patent: Aug. 2, 2022

(54) INSTALLATION METHOD AND DEVICE FOR PIPELINE COMPONENTS

(71) Applicant: Georg Fischer Rohrleitungssysteme AG, Schaffhausen (CH)

(72) Inventors: Alexander Ebauer, Trossingen (DE); Robert Reiz, Stühlingen (DE)

(73) Assignee: Georg Fischer Rohrleitungssysteme AG, Schaffhausen (CH)

( * ) Notice: Subject to any disclaimer, the term of this patent is extended or adjusted under 35 U.S.C. 154(b) by 34 days.

(21) Appl. No.: 16/565,866

(22) Filed: Sep. 10, 2019

(65) Prior Publication Data

US 2020/0086464 A1  Mar. 19, 2020

(30) Foreign Application Priority Data

Sep. 19, 2018  (EP) ...................................... 18195478

(51) Int. Cl.
| | | |
|---|---|---|
| *B25B 23/142* | (2006.01) | |
| *F16L 15/04* | (2006.01) | |
| *G01L 5/24* | (2006.01) | |
| *B23P 19/06* | (2006.01) | |
| *B23P 11/00* | (2006.01) | |

(52) U.S. Cl.
CPC ........ *B25B 23/1425* (2013.01); *B23P 19/061* (2013.01); *F16L 15/04* (2013.01); *G01L 5/24* (2013.01); *B23P 11/00* (2013.01); *F16C 2226/60* (2013.01)

(58) Field of Classification Search
CPC .................... B23P 19/061; B23P 11/00; B25B 23/1422–1427; F16C 2226/60; F16C 2226/70; F16L 16/04; F16L 55/17; G01L 5/24
See application file for complete search history.

(56) References Cited

U.S. PATENT DOCUMENTS

| | | | |
|---|---|---|---|
| 3,916,234 A * | 10/1975 | Stigall .................... | F16C 41/007 310/155 |
| 5,502,883 A * | 4/1996 | Ohmi ..................... | B25B 21/002 29/407.02 |
| 2014/0105680 A1* | 4/2014 | Schnebele ............... | F16C 25/06 403/359.5 |

FOREIGN PATENT DOCUMENTS

| | | | | |
|---|---|---|---|---|
| DE | 694 15 213 T2 | 5/1999 | | |
| DE | 103 28 381 A1 | 1/2005 | | |
| EP | 0 627 282 A1 | 12/1994 | | |
| JP | 2007015476 A * | 1/2007 | ............ | F16C 33/783 |
| WO | WO-2016-062915 A1 | 4/2016 | | |

OTHER PUBLICATIONS

Machine translation of JP 2007015476 A (Year: 2007).*

* cited by examiner

*Primary Examiner* — Christopher J Besler

(74) *Attorney, Agent, or Firm* — Harness, Dickey & Pierce, P.L.C.

(57) ABSTRACT

Method and device for tightening a threaded connection, preferably for connecting pipeline components, wherein the threaded connection to be tightened comprises a connecting element unit having an external thread, a connecting element unit having an internal thread, and a seal element arranged therebetween.

2 Claims, 4 Drawing Sheets

INSTALLATION METHOD AND DEVICE FOR PIPELINE COMPONENTS

CROSS-REFERENCE TO RELATED APPLICATIONS

This application claims the benefit and priority of European Patent Application 18 195 478.5 filed Sep. 19, 2018. The entire disclosure of the above application is incorporated herein by reference.

FIELD

The invention relates to a method for tightening a threaded connection, and to a corresponding device, preferably for connecting pipeline components, wherein the threaded connection to be tightened comprises a connecting element unit having an external thread, a connecting element unit having an internal thread, and a seal element arranged therebetween, wherein the method comprises the following steps:

turning the connecting element unit having internal or external thread until contacting the seal element, wherein the seal element is arranged on or in at least one of the connecting element units;

tightening the connecting element unit having internal or external thread;

wherein the device comprises a main body, in which a torque measuring sensor for ascertaining the required torque, a sensor for ascertaining the location and location change, preferably a gyroscope for ascertaining the rotational angle, a detection device, a storage element for storing the screw-connection-specific data, and a transmitter for transmitting the acquired data are arranged, and a hook insert.

BACKGROUND

The tools known from the prior art for ascertaining whether a screw connection is sufficiently tightened are usually used in automobile construction, which generally involves metal screw connections, which are attached in more or less constant environmental conditions. Because of this, tools are usually used which detect the torque and also the rotational angle and upon reaching a specific torque it is specified how large the rotational angle to be tightened still has to be so that the screw connection is tightened correspondingly according to the requirements.

DE 103 28 381 A1 discloses such a torque wrench which measures the torque and when the required torque is reached, a specific rotational angle still has to be applied to reach the required strength. It is disadvantageous in this case that this method may not be applied independently of materials of the elements to be connected. This means that different materials require a different applied rotational angle and this can also in turn be dependent on the external temperature. In the first phase, the torque is thus detected by means of a tool until the predetermined torque is reached, however, the required rotational angle application is predetermined independently of the external temperature or other boundary condition. It can thus be that in the case of a required application of, for example, 180°, in the case of a screw connection which also has dirt particles in the thread and at installation temperatures of −20° C., the finally occurring torque will result as much higher than in the same screw connection at an installation temperature of 30° C., which has a clean thread. All of these circumstances then result in undesired tensions in the thread and/or in the screw connection, which then result in a failure or a leak.

WO 2016/062915 A1 also discloses the above-mentioned method from the prior art, wherein it is applied here to a pipeline connection.

SUMMARY OF THE INVENTION

It is an aspect of this invention to propose a method which checks the tightening of a threaded connection constantly during the entire tightening process, whereby the risk of undesired tensions because of incorrect torques being applied is avoided. Moreover, the device is to ensure simple handling and avoid installation errors.

This aspect is achieved according to a preferred embodiment of the invention in that the starting point of the compression of the seal element and the threshold value because of the occurring ratio changes between rotational angle and torque are ascertained during the turning and tightening of the threaded connection.

The method according to a preferred embodiment of the invention for tightening a threaded connection, preferably for connecting pipeline components, wherein the threaded connection to be tightened comprises a connecting element unit having an external thread, a connecting element unit having an internal thread, and a seal element arranged therebetween, includes the following steps:

Turning the connecting element unit having internal or external thread until contacting the seal element and reaching the starting point of the compression of the seal element. The starting point of the compression of the seal element begins upon the contact of the opposing connecting element unit with the seal element. The seal element is arranged on or in at least one of the connecting element units and is contacted with the other or the opposing connecting element unit during the turning or twisting together of the connecting element units. Up to the starting point of the compression, a torque is applied which corresponds to nearly 0 Nm, only the friction occurring in the thread requires a minor torque to turn the connecting element unit towards one another.

From reaching the starting point of the compression, the tightening of the connecting element unit having internal or external thread begins up to a predetermined threshold value, at which the torque to be applied increases immensely in relation to the rotational angle which is executed.

A connecting element unit preferably comprises a flange or socket having external thread arranged thereon and the other connecting unit having internal thread also comprises a flange or socket, wherein a separately formed nut arranged on the flange comprises the internal thread. Of course, however, other embodiments of the connecting units are also conceivable, such as the internal thread or the nut being fixed on the flange.

The starting point of the compression of the seal element and the threshold value are points at which the ratio between rotational angle and torque decisively changes during the tightening of the threaded connection. The ratio between rotational angle and torque is close to 0 Nm per degree until reaching the starting point of the compression, as already mentioned. In a torque-rotational angle diagram, it can thus be established in the curve that the turning of the threaded connection has an approximate infinite steep slope. The turning extends constantly up to the starting point of the compression, wherein the ratio rotational angle/torque corresponds to the slope of a curve in a torque-rotational angle diagram. Upon reaching the starting point of the compression, the curve experiences a change in the slope and thus in the ratio between rotational angle and torque. The curve from then extends having a smaller slope during the tightening, i.e., having a higher torque until reaching the threshold value. At the threshold value, the slope, i.e., the ratio between rotational angle and torque, again changes decisively. The curve flattens out again, i.e., the torque significantly increases in relation to the executed rotational angle and thus the slope flattens out to approximately 0. The tightening procedure is terminated upon reaching the threshold value.

It has proven to be advantageous if almost no torque is applied until reaching the starting point of the compression of the seal element and thus the slope of a curve in a torque-rotational angle diagram extends infinitely steeply and/or approximately parallel to the rotational angle axis in the y direction. The minor torque present during the turning occurs because of the friction in the thread, wherein this is sufficiently minor that it is to be neglected in the method according to the invention. A higher torque only occurs when a resistance is present, which occurs here due to the contacted seal element with the other connecting element unit.

It has proven to be advantageous that a torque is applied from reaching the starting point of the compression of the seal element, wherein the ratio between rotational angle and torque significantly changes and/or the slope significantly decreases from reaching the starting point of the compression of the seal element.

The ratio between rotational angle and torque preferably extends approximately linearly from reaching the starting point of the compression of the seal element up to the threshold value. This means the torque increases approximately linearly in relation to the applied rotational angle, wherein the slope or the ratio is dependent on different factors and properties, such as for example, material of the connecting element units and the seal, installation temperature, cleanliness, installation duration, etc.

In one preferred embodiment of the method, the ratio between rotational angle and torque from reaching the threshold value changes in comparison to the ratio between rotational angle and torque before reaching the threshold value, wherein the slope of the curve from reaching the threshold value in the torque-rotational angle diagram is substantially reduced in relation to the profile of the curve before reaching the threshold value. From the threshold value, the curve extends at a slope which is close to 0, since the torque to be applied is enormously high in relation to the rotational angle.

It has proven to be advantageous if the ratios between rotational angle and torque are ascertained by means of an algorithm. It can thus be ascertained during the tightening procedure of the threaded connection whether a ratio change occurs between rotational angle and torque and corresponding notifications are output or reported, that the connection is sufficiently tightened or also the starting point of the compression is reached. It is advantageous if the ascertained data of the tightening process are accordingly collected, for example, in a cloud, whereby a plurality of experiential values can be recorded and the algorithm can be optimized using the corresponding data of the preset of the device according to the invention.

The algorithm for ascertaining the ratio between rotational angle and torque preferably reads as follows: if the ascertained ratio rotational angle (DW)/torque (DM) differs at least by +/−10%, preferably +/−20% in relation to the preceding measurement or the mean value of the preceding measurements, an inflection point of the curve and thus reaching the starting point of the compression or threshold value is established.

This aspect is also achieved according to the invention in that the hook insert has a code and when coupling the hook insert, the code is acquired by the detection device on the main body and the screw-connection-specific data are automatically set on the device.

The device according to the preferred embodiment of the invention for tightening a threaded connection of pipeline components comprises a main body in which a torque measuring sensor for ascertaining the prevailing or applied torque, a sensor for ascertaining the location and location change, preferably a gyroscope for ascertaining the rotational angle, a detection device, a storage element for storing the screw-connection-specific data, and a transmitter for transmitting the acquired data are arranged. Moreover, the device includes a hook insert, wherein the hook insert is replaceably arranged on the main body, wherein the hook insert comprises a code and the code is acquired by the detection device on the main body upon coupling of the hook insert and the screw-connection-specific data are automatically set on the device.

By way of the code on the hook insert, the device automatically sets itself to the values which were stored in the code. The corresponding values for, for example, a defined screw connection dimension are thus automatically preset on the device, whereby it is then automatically communicated to the operator when the threaded connection is sufficiently tightened. Because the operator does not have to input values on the device themselves but rather everything runs autonomously, installation errors can be avoided.

It has proven to be advantageous if the device comprises a measuring device for ascertaining the geographic location, preferably a GPS receiver. It can thus be accurately ascertained where the screw connection was installed and these data can be transferred into a corresponding site plan, so that it is also precisely shown later where which threaded connection is located, because usually such connections are buried under the streets or are in ceilings at several metres high, where they are poorly accessible and it can only be comprehended with great effort how they were installed and/or whether they were correctly installed. Moreover, a chip or another code can also be arranged on the threaded connection to also input this via the device and record the data of the threaded connection or another fitting in a site plan and manage them with the installation data. This helps in the case of repair and maintenance work, since before a street is torn up or a production facility is stopped, it is already known what was installed and how it was installed. These data can also be centrally collected and accordingly retrieved again. Due to the central collection of the different data, different items of information can also be linked and displayed on a display device, as required by the operator.

As a further possible embodiment, the option exists that the device comprises a sensor for material detection, preferably a colour sensor, whereby the colour of the threaded connection and/or the plastic of the threaded connection can be ascertained. This, in conjunction with the code on the hook insert, specifies precisely to the device which threaded connection is tightened, since the code includes the dimension of the screw connection and further data and the colour of the threaded connection to be screwed together permits the device to detect which plastic the threaded connection comprises. All of these data are used for the definition of the required torque as a function of the rotational angle, which have been stored in the device in the memory. Of course, these data can also be centrally collected and autonomously queried by means of the device according to the invention.

Alternatively, the hook inserts can also have different colours which are associated with a material of the screw connection, whereby the code on the hook insert also transmits these data to the device and the operator already encounters the material and/or the plastic assignment of the threaded connection upon selection of the hook insert having the corresponding colour.

The operator receives signals from the device, whether they are acoustic, haptic, or visual, which indicate to the operator that the points to be ascertained such as starting point of the compression and threshold value are reached. The complete installation and/or the measurement curve in the torque-rotational angle diagram is recorded and stored and is also transmittable to a smart phone, tablet, computer, or other visual medium and can be stored.

BRIEF DESCRIPTION OF THE DRAWINGS

All possible embodiments can be freely combined with one another and the method features also apply to the device and vice versa.

An exemplary embodiment of the invention will be described on the basis of the figures, wherein the invention is not only restricted to the exemplary embodiment. In the figures.

DETAILED DESCRIPTION OF THE PREFERRED EMBODIMENT

Figure 1:
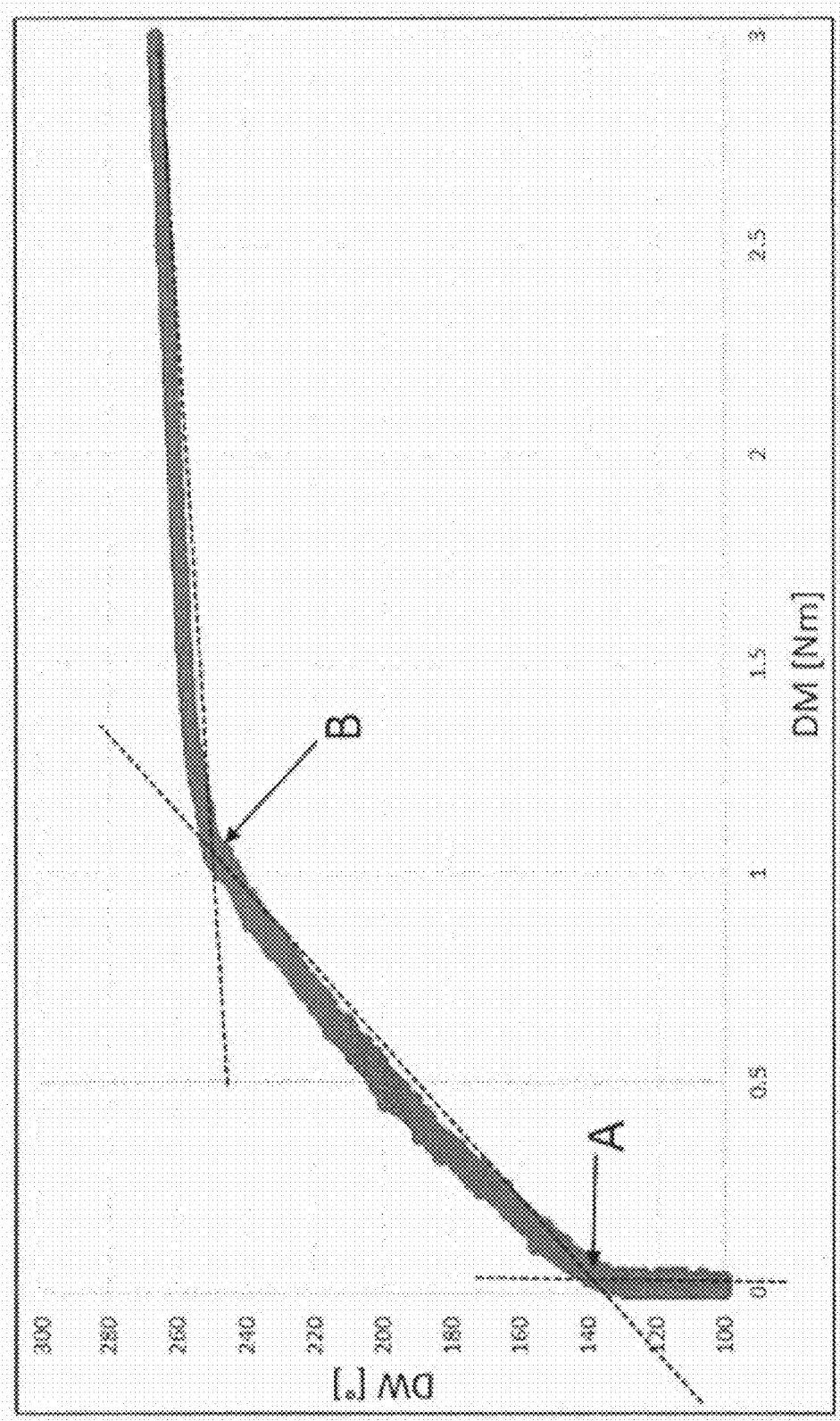
FIG. 1 shows a torque-rotational angle diagram having the profile of the tightening of the screw connection.

The diagram illustrated in FIG. 1 shows the sequence of the tightening of the screw connection in a torque-rotational angle diagram. In the lower region up to the starting point of the compression A, the nearly vertical or parallel profile in relation to the Y axis can be seen well. This indicates that hardly any torque occurs there, since no resistance or only that because of the thread exists and the torque is required to turn the connecting element unit 6 until an annular seal element 7 is contacted. Of course, other seal elements such as flat seals or others are also conceivable, and also other structural forms of threaded connections can be used than that shown in FIG. 2.

Figure 3:
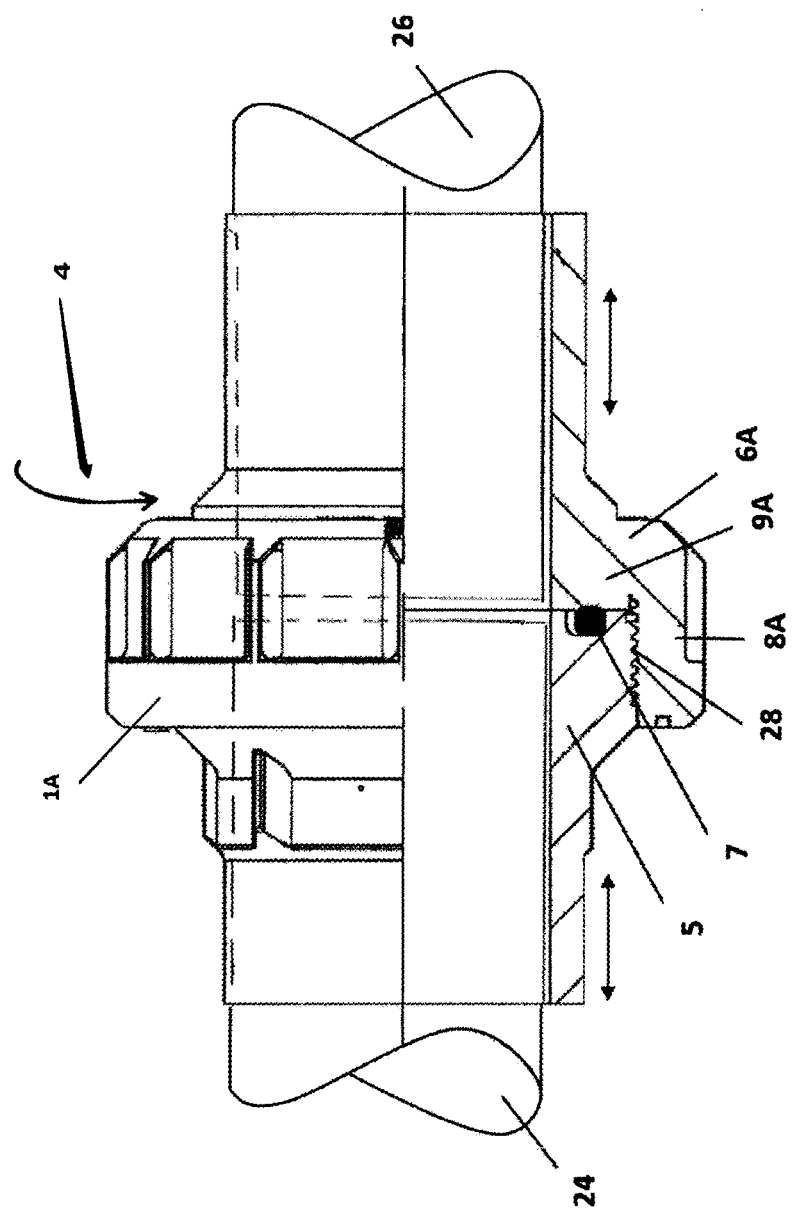
FIG. 3 shows an alternative exemplary threaded connection which is tightened by the method according to the invention.

As soon as the connecting element unit 6 having internal thread, which is arranged in a separate nut 8, contacts the seal 7 with the end face of the flange 9, the resistance grows and the torque DM increases in relation to the performed rotational angle DW, as can be seen from the starting point of the compression A. From then, a preferably linear increase of the torque thus extends in a constant ratio in relation to the rotational angle which is executed. The slope of the curve has thus significantly decreased after reaching the starting point of the compression A. Upon reaching the threshold value B, a change of the ratio between torque and rotational angle and/or the slope of the curve again takes place, since at this point the one connecting element unit contacts the other and not only the seal element 7 as at the beginning, but rather the one end face of one connecting element unit 5 abuts the other end face of the other connecting element unit 6. From then, a substantial increase of the torque DM is to be noted, wherein the installation is generally terminated upon reaching the threshold value B. An alternative design of a threaded connection 4 is shown in FIG. 3, which can be tightened using the method according to the invention, wherein in this design the internal thread is not arranged in a separately embodied nut on a flange, but rather is formed as one piece as in the case of the connecting element unit having external thread 5. These embodiments shown of the possible designs for the threaded connection are not exhaustive, rather the threaded connections 4 shown are to indicate possible variants of many, since the invention is also the method for tightening a threaded connection 4 and a corresponding device 1 and not the exact design of a threaded connection 4 itself.

Figure 4:
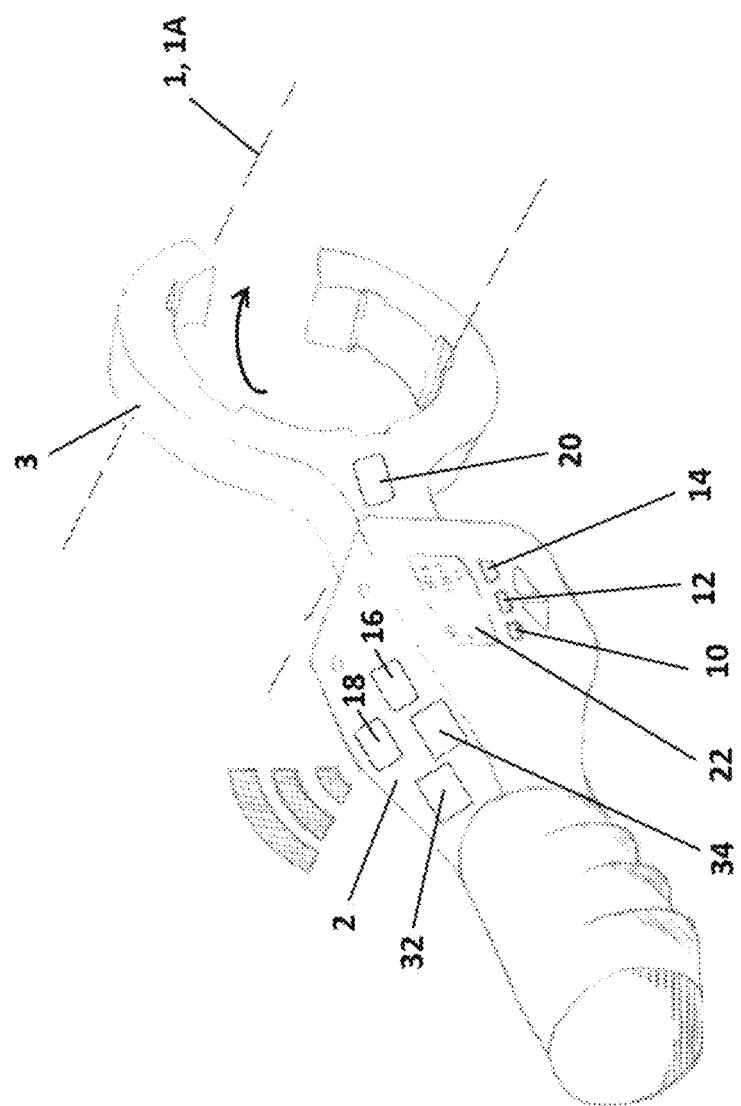
FIG. 4 shows a schematic illustration of a device according to the invention.

The device 1 which is schematically shown in FIG. 4 is only to provide a rough impression of the device 1 and the housing 2 indicates that the hook insert 3 is adaptable. A display 22 is to aid in the operation, but it is also conceivable that the display can be replaced by a smart phone and all specifications can be displayed similarly there. A data transfer can be carried out with or else without cable.

Figure 2:
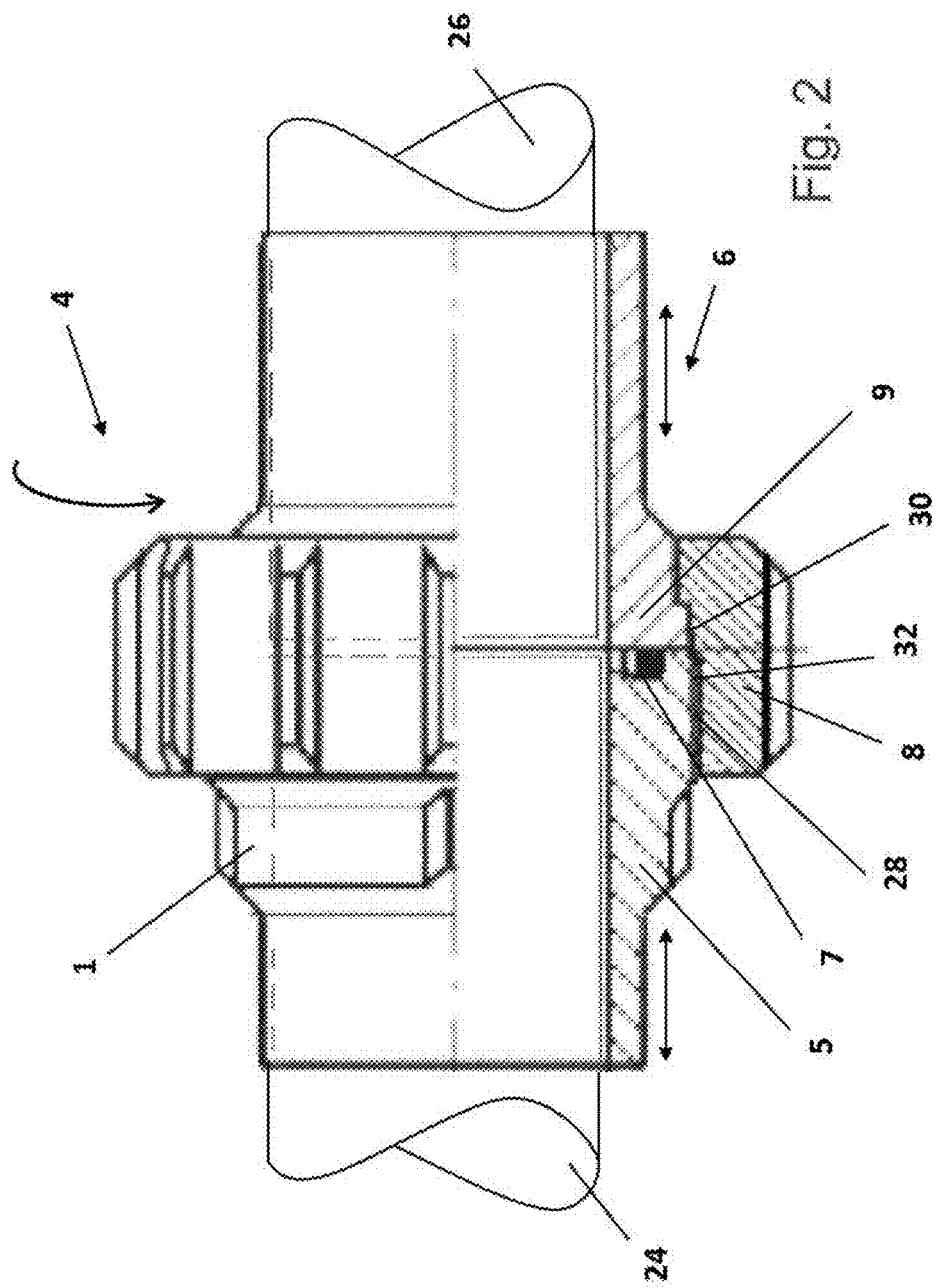
FIG. 2 shows an exemplary threaded connection which is tightened by the method according to the invention.

Again, to summarize, the connecting device 1 is preferably used to clamp together two ends of pipes 24 and 26. In the device of FIG. 2, a connecting element 5 has an externally extending thread 28 (also shown in FIG. 3). A second connecting element 6 has a flanged end 9 having a projection 30 that is captured in a recess in a nut 8. The nut has internally directed threads 32. The embodiment of FIG. 3. is substantially similar to the embodiment of FIG. 2 except that the connecting element 6A is configured to integrally form the nut 8A.

Information about the characteristics of pipes 24, 26 and size of the nut is stored as a code in a memory 20 in insert 3 that has an end portion configured as a wrench to grasp and rotate the nut 8 or 8A. Insert 3 may be one of a plurality of separately color-coded inserts, the color of which corresponds to further information about the particular pipes to be connected.

The properly selected insert 3 is inserted into the body 2. When inserted, the code stored in memory 20 is transmitted to storage element 16. Body 2 also may include a torque measuring sensor 10 for measuring the torque applied by body 2 to device 1. A sensor 12 may also be provided in body 12 for ascertaining the geographic location of body 2. A detection device 14 and transmitter 18 may also be preferably provided in body 2, as well as a measuring device 32 for ascertaining the geographic location of body 2 and a sensor 34 for material detection. Sensor 34 is preferably a color sensor where the material characteristics of pipes 24, 26 can be sensed.

The user grasps the handle of body 2 and rotates the wrench insert 3 which in turn rotates the nut 8, 8A of the connecting device 1, 1A. This rotational action urges connecting elements 5, 6 or 6A towards each other until their adjacent ends engage seal 7. The sensors in body 2 monitor the various torque and rotational angles (and other parameters) as the user continues to rotate the body 2 about nut 8, 8A to urge the connecting elements 5, 6 or 6A together until the threshold B is reached.

The provision of the seal 7 between connecting elements 5, 6 or 6A is particularly advantageous. This is because the compression of the seal helps define the rotation/torque slopes shown in FIG. 1 that easily generates point B that is readily detectable. The seal 7 also provides a leakproof connection between the pipes 24, 26. Prior art tools for tightening lug nuts when changing wheels do not include such a seal and, therefore, did not provide a leak proof connection.

Furthermore, if different environmental conditions (for example, temperature, humidity, etc.) are encountered between installations the relationship between the material (usually plastic) of the pipes 24, 26 and the seal 7 will change behavior. For example, if the installation temperature is 100° F. one would need more rotations of the connecting device 1 to achieve the required torque. On the other hand, if the installation temperature was 20° F. the optimum torque would be achieved with less rotations. With the provision of the seal 7 that helps generate the FIG. 1 slope curve, the tool is rotated a sufficient number of times until point B is detected. It will be appreciated that the number of rotations of the connecting device 1 will vary depending upon the material of the pipes and the operating environmental conditions before point B is detected and the rotation can be stopped.

The invention claimed is:

1. A method for tightening a threaded connection between a first pipe and a second pipe, the threaded connection including a first connecting element unit having an external thread, a second connecting element unit having an internal thread, and a seal element arranged therebetween, the method comprising:

inserting the first pipe into the first connecting element unit and inserting the second pipe into the second connecting element unit;

turning the second connecting element unit toward the first connecting element unit with essentially no torque being applied, wherein a slope of a curve in a torque-rotational angle diagram extends nearly infinitely steeply and/or approximately parallel to a rotational angle axis in a y direction;

detecting when an ascertained ratio rotational angle (DW)/roque (DM) differs by at least +/−10% in relation to a preceding measurement thereby indicating a starting point of compression of the seal element;

thereafter, tightening the first connecting element unit and the second connecting element unit together while continuing to detect when the ascertained ratio rotational angle (DW)/torque (DM) differs by at least +/−10% in relation to a preceding measurement, wherein the ratio between rotational angle and torque or the slope of the cure in the torque-rotational angle diagram extends approximately linearly from the starting point of the compression of the seal element; and continuing to detect when the ascertained ratio rotational angle (DW)/torque (DM) differs by at least +/−10% in relation to another preceding measurement and stopping further tightening when a threshold value is reached as indicated by a decrease of the slope of said curve, the threshold value being reached when a first end face of the first connecting element unit abuts against a second end face of the second connecting element unit.

2. The method according to claim 1, wherein the ratio between rotational angle and torque is ascertained by an algorithm.

* * * * *